United States Patent [19]

Hasser et al.

[11] 4,151,338

[45] Apr. 24, 1979

[54] METHOD FOR THE PREPARATION OF HIGH MELTING C4-HYDROCARBON RESINS

[75] Inventors: Günter Hasser; Werner Hübel, both of Herne; Werner Nagengast, Recklinghausen; Josef Disteldorf; Horst Schnurbusch, both of Herne, all of Fed. Rep. of Germany

[73] Assignee: Veba-Chemie Aktiengesellschaft, Gelsenkirchen-Buer, Fed. Rep. of Germany

[21] Appl. No.: 897,019

[22] Filed: Apr. 17, 1978

[30] Foreign Application Priority Data

Apr. 16, 1977 [DE] Fed. Rep. of Germany ....... 2716877

[51] Int. Cl.$^2$ .................... C08F 4/52; C08F 236/06
[52] U.S. Cl. .................... 526/185; 526/237
[58] Field of Search ............... 526/185, 237

[56] References Cited

U.S. PATENT DOCUMENTS

| | | | |
|---|---|---|---|
| 2,220,930 | 11/1940 | Kraus | 526/185 |
| 2,387,517 | 10/1945 | Kraus | 526/189 |
| 3,349,065 | 10/1967 | Kennedy | 526/185 |
| 3,446,785 | 5/1969 | Stafford | 526/185 |
| 3,661,870 | 5/1972 | Bullard | 526/185 |
| 3,692,756 | 9/1972 | Cyr | 526/185 |

*Primary Examiner*—William F. Hamrock
*Attorney, Agent, or Firm*—Oblon, Fisher, Spivak, McClelland & Maier

[57] ABSTRACT

A method for the preparation of high-melting resins which comprises polymerizing a butadiene-rich C4-cut of C4-olefins with a liquified protonated Friedel-Crafts catalyst of the formula $$AlX_nR_m \cdot HX$$

wherein
X = Cl, Br, I;
R = $C_1$–$C_4$ alkyl or isoalkyl group;
n = 1–3;
m = 0–2;

wherein the catalyst is liquified with alkyl benzenes containing $C_1$–$C_4$ alkyl or isoalkyl groups and wherein the C4-olefin cut is used with a content of from 50–70% of 1,3-butadiene and the polymerization takes place at 35°–80° C. The high-melting resin obtained by the aforementioned method.

9 Claims, No Drawings

METHOD FOR THE PREPARATION OF HIGH MELTING C₄-HYDROCARBON RESINS

BACKGROUND OF THE INVENTION

1. Field of the Invention

This invention relates to a method for the preparation of high-melting C$_4$-hydrocarbon resins. The resins show units which are chiefly derived from 1,3-butadiene, isobutene, 1-butene, cis-2-butene and trans-2-butene, that is, from olefins of the C$_4$-hydrocarbons.

2. Description of the Prior Art

In the presence of cationic, anionic or radical catalysts and also in the absence of catalysts, it is possible to polymerize the aforementioned C$_4$-hydrocarbons in known fashion, singly and also in the presence of various additives. For example, butadiene typically yields, depending on the nature of the catalysts and of the reaction conditions, gummy materials and cyclic oligomers. In the presence of AlCl$_3$ as a catalyst, butadiene yields a sticky, amorphous material which is clearly not technically satisfactory as an elastomer. Isobutene and 1-butene yield sticky elastomers and polymers, but no high-melting resins. Trials to polymerize 2-butene, did not yield typical resins either, but mostly gave rise to oily products of low molecular weights.

The polymerization of single olefins of C$_4$-hydrocarbons to resins is obviously unsatisfactory or does not occurr at all. It should be mentioned that mixtures of C$_4$-olefins can occurr in the following compositional ranges as the so called C$_4$-cuts during the cracking of petroleum to ethylene and propylene:

| butadiene | 30–50% |
|---|---|
| isobutene | 20–35% |
| 1-butene | 10–20% |
| 2-cis/trans-butene | 5–20% |
| n-butane | 2–10% |
| isobutane | 1–3% |
| other C$_{3-5}$-hydrocarbons | less than 2% |

Experiments were thus undertaken, wherein mixtures of C$_4$-olefins, especially those which contained butadiene and isobutene, were polymerized with various catalysts. It was thus found, in accordance with the hereinafter described references that butadiene-free C$_4$-olefins only yield oily polymerizates, wherein with increasing butadiene content, the polymerization gives rise predominantly to elastic products. The cationic polymerization of mixtures of butadiene-containing C$_4$-olefins with aluminum halides gives rise according to DT-OS No. 2053788 to resins. Although these resins are solids at room temperatures, they are technically not very satisfactory; only through the addition of C$_5$-olefins to the polymerization was it possible to improve the results. It is known, according to JA-ASS Sho No. 43-38813 and Sho 45-15435 to prepare somewhat higher melting resins from butadiene-containing C$_4$-cuts even at low temperatures and in the presence of C$_5$-olefins or with concomitant aging. The latter is disadvantageous in that the resins become darkened.

It has been discovered that, surprisingly, butadiene-rich C$_4$-olefins can be transformed to high-melting resins with the aid of protonated aluminum halide-catalysts (Friedel-Crafts catalysts), when the polymerization occurs at temperatures starting at 30° C. and the butadiene content is preferably at least 50%. Further surprising is that the formation of polymerizates with superior elastic properties is excluded.

SUMMARY OF THE INVENTION

It is thus an object of the invention to provide a method for the preparation of high-melting resins which comprises polymerizing a butadiene-rich C$_4$-cut of C$_4$-olefins with a liquified protonated Friedel-Crafts catalyst of the formula $$AlX_nR_m \cdot HX$$

wherein X=Cl, Br, I; R=C$_1$–C$_4$ alkyl or isoalkyl group; n=1–3; and m=2–0; wherein said catalyst is liquified with alkylbenzenes containing C$_1$–C$_4$ alkyl or isoalkyl groups and wherein said C$_4$-olefin cut is used with a content of from 50–70% of 1,3-butadiene and the polymerization takes place at 35°–80° C.

DESCRIPTION OF THE PREFERRED EMBODIMENTS

Butadiene-rich C$_4$-olefins are separated as the so called C$_4$-cuts during the cracking of petroleum to ethylene and propylene. Through the addition of butadiene it is thus possible to prepare butadiene-rich C$_4$-mixtures.

The resins obtained from such butadiene-rich C$_4$-olefins show the following compositions:

50–75% units, derived from 1,3-butadiene
20–40% units, derived from isobutene
10–20% units, derived from 1-butene
5–10% units, derived from 2-cis/trans-butene The resins show the following data and characteristics:

| Appearance | transparent, light, similar to natural resin |
|---|---|
| Molecular Weight | 800–3,000 |
| Melting Range | 85–120° C. clear melting |
| Solubility | Soluble in aliphatic and aromatic solvents, less soluble in strongly polar solvents |
| Temperature Stability | Practically no decomposition and no darkening up to 250° C. |

The butadiene-rich C$_4$-olefins may contain up to 20% of compounds which in the presence of Friedel-Crafts catalysts can be polymerized into the C$_4$-resin. Such compounds are for example, other unsaturated hydrocarbons such as ethylene, propylene, additional C$_4$-monoolefins, pentadiene, pentene, hexadiene, hexene, styrene, alkylstyrene, indene, alkylindene, etc.

Aromatics such as benzene, alkylbenzene, naphthalene, can also be utilized since under the conditions of the Friedel-Crafts polymerization they are alkylated by the C$_4$-olefins and can thus be incorporated into the C$_4$-resin. Naturally it is also possible to use additives of C$_5$–C$_9$-cuts which are separated during the distillative work-up of the cracked gasoline. The modification of the C$_4$-resin through the aforementioned olefins and aromatics can take place by various methods:

1. Through the addition of one or more compounds up to a concentration of at most 20% in the C$_4$-cut before the polymerization.
2. Through the addition of one or more of the compounds up to a concentration of at most 20% in the C$_4$-cut during the polymerization in the presence of the active catalyst.

The high-melting C$_4$-resins prepared by the present invention possess properties which can vary within certain defined ranges, depending on the composition of the C$_4$-cut and on the eventual additives.

Thus for example, an increase in the concentration of isobutene leads to a lowering of the melting range; an increase of butadiene results on the other hand in an increase in the melting range of the resin; while toluene and other aromatics can act as chain terminators or chain branching agents and thus reduce the viscosity and possibly the molecular weight. It is possible to modify the C$_4$-resins so that they thus can be used in specialized applications; for example, as the adhesive medium in hot adhesives and in road-marking compositions or as hydrophobic medium for coatings.

The polymerization, i.e., the resinification of the butadiene-rich C$_4$-olefins (including eventual additives), can comprise:

The liquid catalyst which for example is prepared by suspending AlCl$_3$ in toluene, xylene or other alkylated benzenes and gasified with HCl until the liquid complex-catalyst is formed, is added dropwise, at the reaction temperature, to the resinifying C$_4$-cut, which is to be mixed with an appropriate solvent when the concentration of olefins is high.

The catalyst which has thus been liquified with HX in an alkylated benzene and the butadiene-rich C$_4$-olefin are then simultaneously added to a reactor, to which if necessary the solvent has been previously added.

The amount of the catalyst is to be chosen preferably so that a new addition of catalyst would not cause the formation of more resin. Normally it is necessary to use 0.5–5%, preferably 0.5–2% of AlX$_n$R$_m$·HX taken in reference to the butadiene-rich C$_4$-olefins, in order to practically complete resinification.

When the reaction is carried out in the presence of a diluent, this diluent should boil at a temperature above the reaction temperature. This diluent should be a solvent for the resinifying olefins and for the formed C$_4$-resin. Appropriate diluents are alkanes, cycloalkanes, and also refluxing monomers and oligomers, recovered after the resinification.

The polymerization temperature can be in the range of from 35° C. to 80° C. depending on the activity of the catalyst; preferably the temperature is 35°–65° C. At temperatures of less than 35° C. rather than elastic polymerizates, one obtains sticky or liquid, partially crystalline higher molecular weight polymerizates. Since the resinification occurs in liquid phase, the reaction temperature, reaction pressure and reaction volume are to be chosen so that the liquid phase will remain as such under its own pressure during the resinification. The time length of the resinification can last of from a few minutes to several hours; preferably the length is from 30 minutes to 3 hours.

The mixture to be resinified can be modified according to the present invention with the previously mentioned additives to the C$_4$-resin, prior to the addition of the catalyst or also after partial addition or complete addition of the catalyst.

At the end of the resinification, the catalyst can be suitably destroyed or eliminated. This takes place through the direct treatment of the resin mixture with water, caustic soda, or ammonia in the presence or absence of phase-combining substances such as methanol or isopropanol at 20°–200° C., preferably at 100°–180° C.; the resinified mixture can previously be partially or totally degased.

The high-melting C$_4$-resins obtained by the present invention, which contain C$_4$-units in cyclic or non-cyclic form, are soluble in aliphatic and aromatic solvents and are compatible with lacquer-forming and lacquer-melt-adhering components. The resins are suitable, among other things, as lacquer-forming and -protecting components, as adhesive-causing media in heat adhesives and as adhesive coating compositions, such as for example are used for road markings and carpet coatings. They are partly comparable with the neutral C$_5$-and C$_9$-based hydrocarbon-resins; they are different from the C$_5$-resins in general because of their higher melting temperatures and higher temperature stability; the latter is obtained by the fact that C$_4$-resins do not contain any cyclopentadiene and cyclopentadiene-derivatives as contrasted to C$_5$-resins which are generally prepared from cyclopentadiene-containing C$_5$-streams. Compared to the C$_9$-resins, the C$_4$-resins of the present invention show, because of the absence of aromatic components, a higher light stability and higher oxidation stability.

Having generally described the invention, a more complete understanding can be obtained by reference to certain specific examples, which are included for purposes of illustration only and are not intended to be limiting unless otherwise specified.

EXAMPLE 1

A mixture of 1000 gm of 1,3-butadiene-rich C$_4$-olefins, containing 50.2% 1,3-butadiene, 24% isobutene, 20% t-butene-2 and butene-1, 3% cis-butene-2 and 8% butane/isobutane was prepared in 3000 ml olefin-free gasoline with a boiling point of 100°–125°, in a 10 liter pressure-reactor, which was equipped with a stirrer, heating and cooling mantle, thermometer, manometer, and entrance and exit-valves. Within one hour it was reacted at 35° C. while stirring with 30 gm of (AlCl$_4$)$^-$·H$^+$·1.8C$_6$H$_5$–CH$_3$. (For the preparation of the catalyst, one mole of AlCl$_3$ was suspended in 3 moles of toluene and was gasified with HCl in a dry nitrogen atmosphere; the catalyst was formed in the lower phase as a red-brown liquid). Stirring was continued for one hour at 35° C. and the liberated heat was transported over the cooling mantle. The catalyst was then destroyed through the addition of 500 ml of 5% caustic soda at 125° within a period of one hour. The organic, resin-containing phase was separated from the lower aqueous phase, filtered and concentrated through a distillation at 20→150° C. and 760→20 mm Hg. For the separation of the higher boiling oily polymerizates, the organic phase was further treated at 150° C. in vacuo with steam until the condensate did not contain any more oily fractions. A transparent C$_4$-resin was obtained which showed the following characteristics:

| | |
|---|---|
| Yield, relative to the butadiene-rich C$_4$-olefin-mixture | 82% |
| Softening point R + K | 104° C. |
| Br-count | 73 |
| Molecular Weight | 2200 |
| D$_{20}^4$ | 0.95 |
| Color count according to Gardner | 8 (yellowish brown) |

Composition

52% derived from 1,3-butadiene
28% derived from isobutene
10% derived from 1-butene

EXAMPLE 2

1000 g of a mixture of butadiene-rich $C_4$-olefins (composition is described in Example 1) was taken up in 3000 ml olefin-free gasoline with a boiling point of 100°–125° C. and added to the 10 liter reactor described in Example 1. This reactor was heated to 35° C. and at this temperature and over a period of one hour, 30 gm of $AlC_2H_5Cl_2 \cdot HCl \cdot 1.8 C_6H_5CH_3$ were added while stirring. (For the formation of the catalyst, one mole of $AlCl_2 \cdot C_2H_5$ was mixed with 1.8 moles of toluene and gasified under a dry nitrogen atmosphere at 10° C. with HCl. The catalyst fell out as a red brownish oil.) The reaction mixture was stirred for further one hour at 35° C.

The completion of the reaction and the working-up of the reaction mixture followed the description given in Example 1.

| | |
|---|---|
| Yield, relative to the butadiene-rich $C_4$-olefin-mixture: | 42% |
| Softening point R + K | 88° C. |
| Br-count | 74 |
| Molecular Weight | 1600 |
| $D_{20}^4$ | 0.95 |
| Color count according to Gardner | 10 (brown) |

EXAMPLE 3

This example deals with the preparation of a particularly high-melting $C_4$-resin in a continuously running experiment from a mixture of a 1,3-butadiene and a technical $C_4$-stream which after gas chromotographic analysis was shown to contain 58% 1,3-butadiene, 20% isobutene, 11% 1-butene and 6% cis-trans-butene-2; wherein said mixture was reacted with $(AlCl_4)^- H^+ \cdot 1$ mole diosopropylbenzene as a catalyst (the catalyst was prepared by suspending 1 mole of $AlCl_3$ in one mole diisopropylbenzene and liquified with HCl; a red brown oil is formed) as follows:

| | |
|---|---|
| Running time | 144 hours |
| Olefin-stream | 2.7 kg/h, dissolved in 2.7 kg cyclohexane |
| Catalyst | 121 g $AlCl_4H \cdot 1$ mol diosopropylbenzene/h |
| Reaction temperature | 40°–45° C. |
| Average time of reaction | 4 hours |

The continuous preparation was carried out by adding the technical $C_4$-stream and the liquid catalyst into a pressure reactor under stirring at 40°–45° C. A mixture of 1,3-butadiene and a technical $C_4$-stream with a content of 58% 1,2-butadiene, was added, at the same stream velocity, instead of the technical $C_4$-stream, after a running time of 2 hours. The pressure was about 5 atmospheres. After an average residence time of about 4 hours, the reaction mixture was continuously transferred into a pressure reservoir which had previously been charged with 5% caustic soda at 125° C.; during an average residence time of about 5 hours, the catalyst was then destroyed. The organic phase was decanted and worked-up by distillation. The fraction at less than 120° C. was continuously reused as the solvent after addition of fresh cyclohexane.

The $C_4$-resin-containing phase was concentrated at max. 150° C. in vacuum and treated with steam until no more oily fractions distilled.

| | |
|---|---|
| Yield in reference to the mixture of the 1,3-butadiene and technical $C_4$-stream | 89% |
| Softening point R + K | 120° C. |
| Molecular Weight | 2950 |
| Br-count | 73 |
| Color count according to Gardner | 8 (brown) |

EXAMPLE 4

A technical $C_4$-stream, containing 43% 1,3-butadiene, 27% isobutene, 12% 1-butene, 9% 2-cis/trans-butene and 8% butane/isobutane was transformed through addition of 900 gm of 1,3-butadiene per 1000 gm of $C_4$-stream, into a 70% 1,3-butadiene-containing mixture. 1000 gm of this 1,3-butadiene-$C_4$-stream-mixture was taken up in 5000 gm of cyclohexane. The resinification took place by adding at least one-third, i.e. 2000 gm of the solution in cyclohexane to the reactor described in Example 1 and heating to 60° C. At 60° C., within a period of 1 hour and while stirring, 10 gm of $AlCl_4^- H^+ \cdot 1.2 C_6H_5-CH(CH_3)_2$ was added as a catalyst (the preparation is analogous to that described in Example 1). The reaction mixture was stirred for further half an hour and the so formed resin-solution was transferred at room temperature to a centrifuge in order to eliminate the gel-like elastomers formed in this phase which are insoluble in the solvent. The gel-free solution was then rewarmed to 60° C. in the same reactor and within one hour was mixed through a parallel influx with 4000 gm of the 1,3-butadiene-$C_4$-stream-mixture in cyclohexane and with 20 gm of catalyst. Stirring was continued at 60° C. for further one hour. The reaction product was clarified by centrifugation of insoluble materials and worked-up according to the method of Example 1. A strongly unsaturated $C_4$-resin was obtained, which showed the following characteristics:

| | |
|---|---|
| Yield, relative to the 1,3-butadiene-$C_4$-stream | 74% |
| Softening point R + K | 114° C. |
| Br-count | 84 |
| Molecular Weight | 2800 |
| Color count according to Gardner | 11 (brown) |

EXAMPLE 5 (COMPARATIVE EXAMPLE)

The reaction mixture of Example 1 was prepared except that the reaction temperature was −10° C. to 0° C. After the destruction of the catalyst according to Example 1, a gummy, partially crystalline polymerizate practically insoluble in various organic solvents, was obtained as product.

EXAMPLE 6 (COMPARATIVE EXAMPLE)

One part of a technical $C_4$-stream, prepared with the composition of Example 4, and one part of a technical $C_4$-residual stream, containing 57.9% isobutene, 25.9% butene-1, 37% cis/trans-butene-2, 9% n-butane and 2.8% isobutane, were mixed. 1000 gm of this mixture, which showed a 1,3-butadiene content of 21.5% was taken up in 3000 ml, olefin-free gasoline of boiling point 100°–125° C. in the 10 liter-reactor described in Example 1 and resinified at 18°–25° C. The other conditions of the resinification and the work-up are according to Example 1. A sticky product was obtained which showed the following characteristics:

| | |
|---|---|
| Yield, relative to the C$_4$-stream and C$_4$-residual stream | 74% |
| Softening point R + K | less than 25° C. |
| Br-count | 42 |
| Molecular Weight | 2900 |
| Color Count according to Gardner | 7 (light brown) |

What is claimed as new and desired to be secured by Letters Patent of the United States is:

1. A method for the preparation of high-melting resins with a melting range of 85°–120° C. which consists essentially of polymerizing a butadiene-rich C$_4$-cut of C$_4$-olefins with a liquified protonated Friedel-Crafts catalyst of the formula $$AlX_nR_m \cdot HX$$

wherein:

X=Cl, Br, I;

R=C$_1$–C$_4$ alkyl or isoalkyl group;

n=1–3;

m=2–0;

wherein said catalyst is liquified with alkylbenzenes containing C$_1$–C$_4$ alkyl or isoalkyl groups and wherein said C$_4$-olefin cut is used with a content of from 50–70% of 1,3-butadiene and the polymerization takes place at 35°–80° C.; wherein said polymerization is carried out in the presence of less than 2.0% C$_5$ olefins.

2. The method of claim 1, wherein said polymerization temperature is 35°–65° C.

3. The method of claim 1 or 2 wherein the catalyst is AlC$_2$H$_5$Cl$_2$·HCl·1.8C$_6$H$_5$—CH$_3$.

4. The method of claim 1 or 2 wherein the catalyst is AlCl$_3$·HCl·1.8C$_6$H$_5$CH$_3$.

5. The method of claim 1 or 2 wherein the catalyst is AlCl$_3$·HCl·1.2C$_6$H$_5$CH(CH$_3$)$_2$.

6. A high-melting resin obtained by the process of claim 1 or 2.

7. The method of claim 1 wherein the amount of said catalyst is 0.5–5% of AlX$_n$R$_m$·HX taken in reference to the butadiene-rich C$_4$-olefins.

8. The method of claim 7 wherein the amount of said catalyst is 0.5–2% by weight.

9. The method of claim 1, wherein said butadiene-rich C$_4$-cut of C$_4$-olefins is prepared by enrichment with butadiene to a concentration of 50–70% butadiene, a C$_4$-cut of C$_4$-olefins which originally comprises: 30–50% butadiene; 20–35% isobutene; 10–20% 1-butene; 5–20% 2-cis/transbutene; 2–10% n-butene; and less than 2% of other C$_{3-5}$-hydrocarbons.

* * * * *